(12) United States Patent
Ogawa et al.

(10) Patent No.: US 8,687,730 B2
(45) Date of Patent: Apr. 1, 2014

(54) WIRELESS DEVICE AND COMMUNICATION CONTROL PROGRAM

(75) Inventors: Daisuke Ogawa, Yokosuka (JP); Takashi Dateki, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 1 day.

(21) Appl. No.: 13/492,390

(22) Filed: Jun. 8, 2012

(65) Prior Publication Data
US 2013/0044800 A1  Feb. 21, 2013

(30) Foreign Application Priority Data
Aug. 17, 2011  (JP) ................. 2011-178630

(51) Int. Cl.
*H04B 7/02*  (2006.01)

(52) U.S. Cl.
USPC ........... 375/267; 375/252; 375/260; 455/103; 455/126

(58) Field of Classification Search
None
See application file for complete search history.

(56) References Cited

U.S. PATENT DOCUMENTS

| 2007/0165738 A1* | 7/2007 | Barriac et al. | 375/267 |
| 2009/0203335 A1* | 8/2009 | Lee et al. | 455/103 |
| 2011/0164696 A1* | 7/2011 | Choi et al. | 375/260 |

FOREIGN PATENT DOCUMENTS

JP  2009-514460  4/2009

* cited by examiner

*Primary Examiner* — Leon-Viet Nguyen
(74) *Attorney, Agent, or Firm* — Fujitsu Patent Center

(57) ABSTRACT

A wireless device includes a channel covariance matrix calculating unit that calculates a covariance matrix based on a channel matrix estimated based on radio signal transmitted from a transmitting station. The wireless device further includes a first metric calculating unit that calculates a first metric based on the calculated covariance matrix. The wireless device further includes a $W_1$ determining unit that calculates a first precoding matrix common to a plurality of bands based on the calculated first metric. The wireless device further includes second metric calculating units that calculate a second metric using the calculated first precoding matrix. The wireless device further includes an optimal CQI/PMI/RI determining unit that calculates a second precoding matrix of each band based on the calculated second metric.

13 Claims, 11 Drawing Sheets

| RANK | | | 1 | 2 | 3 | 4 | 5 | 6 | 7 | 8 |
|---|---|---|---|---|---|---|---|---|---|---|
| NUMBER OF PMIs | LTE | W | 16 | 16 | 16 | 16 | - | - | - | - |
| | LTE-A | $W=W_1W_2$ | 256 | 256 | 64 | 32 | 4 | 4 | 4 | 1 |
| | | $W_1$ | 16 | 16 | 4 | 4 | 4 | 4 | 4 | 1 |
| | | $W_2$ | 16 | 16 | 16 | 8 | 1 | 1 | 1 | 1 |

US 8,687,730 B2

WIRELESS DEVICE AND COMMUNICATION CONTROL PROGRAM

CROSS-REFERENCE TO RELATED APPLICATION(S)

This application is based upon and claims the benefit of priority of the prior Japanese Patent Application No. 2011-178630, filed on Aug. 17, 2011, the entire contents of which are incorporated herein by reference.

FIELD

The embodiments discussed herein are directed to a wireless device and a communication control program.

BACKGROUND

In recent wireless communication, adaptive control according to propagation environment has been performed. For example, in LTE (Long Term Evolution) system of 3GPP (3rd Generation Partnership Project), adaptive control of a CQI (Channel Quality Indicator), a PMI (Precoding Matrix Indicator), and an RI (Rank Indicator) has been known. The CQI is a value used to decide a modulation scheme and a coding rate, and the PMI is a value used for a transmission side to apply a weight in order to increase a signal gain at a reception side. The RI is a value corresponding to the number of transmission streams of a radio signal. In the LTE system, spectral efficiency is improved by adaptively controlling the CQI, the PMI, and the RI.

For example, a wireless device such as a portable telephone which is a receiving station of a radio signal receives a radio signal transmitted from a transmitting station through a receiving antenna, and estimates a propagation path value and noise power of each sub carrier based on a known signal such as a pilot signal. First, regarding a rank 1, the wireless device calculates a metric (for example, channel capacity) on all precoding matrices using a propagation path value and noise power for each sub carrier. Then, the wireless device extracts a largest metric of each sub carrier, and adds largest metrics of all sub carriers. The wireless device similarly performs this process on each of ranks 2 to 4. The wireless device determines a rank, a PMI, and a CQI that lead to a largest metric based on a calculation result in each rank, and feeds the determination result back to the transmitting station.

A wireless device which is the transmitting station encodes transmission data based on the fed-back CQI using an ECC (error correction code) such as a turbo code, and executes digital modulation QPSK (Quadrature Phase Shift Keying) or QAM (Quadrature Amplitude Modulation) on the encoded data. Here, in the LTE system, a coding rate and a modulation scheme of error correction are controlled for each codeword. The codeword is mapped to a layer, and a transmission data vector of an appropriate size is generated based on the fed-back RI. The transmission data vector generated in this way is subjected to precoding based on the fed-back PMI and then transmitted to the wireless device functioning as the receiving station.

Reference may be had to, for example, Japanese National Publication of International Patent Application No. 2009-514460.

However, in the related art, consideration is not given on how to reduce a computation cost in PMI estimation.

In other words, in the related art, a metric is calculated on all ranks and PMIs, and an optimal rank and PMI are selected. Meanwhile, in the 3GPP, the LTE-A (Advanced) that implements communication at a speed higher than the LTE has been discussed. Unlike the LTE, in the LTE-A, a precoding matrix W is represented by a combination of two types of matrices $W_1$ and $W_2$, for example, $W=W_1W_2$. That is, in the related art, consideration has not been given on a detailed PMI/RI estimating method when two precoding matrices of $W_1$ and $W_2$ are combined. Compared to the LTE, the number of PMIs of the LTE-A increases to be 16 times in ranks 1 and 2, 4 times in a rank 3, and twice in a rank 4, and ranks 5 to 8 are newly added. Thus, since the number of PMIs and the number of ranks to be searched increase, when a technique of performing a full search as in the related art is applied, the computation cost enormously increases.

SUMMARY

According to an aspect of an embodiment of the invention, a wireless device includes a channel matrix estimating unit that estimates a channel matrix based on a radio signal from a transmitting station; a covariance matrix calculating unit that calculates a covariance matrix based on the channel matrix estimated by the channel matrix estimating unit; a first metric calculating unit that calculates a first metric based on the covariance matrix calculated by the covariance matrix calculating unit; a first determining unit that calculates a first precoding matrix common to a plurality of bands based on the first metric calculated by the first metric calculating unit; a second metric calculating unit that calculates a second metric using the first precoding matrix calculated by the first determining unit; and a second determining unit that calculates a second precoding matrix of each band based on the second metric calculated by the second metric calculating unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT(S)

Preferred embodiments of the present invention will be explained with reference to accompanying drawings. The disclosure technique is not limited to the following embodiments.

[a] First Embodiment

Figure 1:
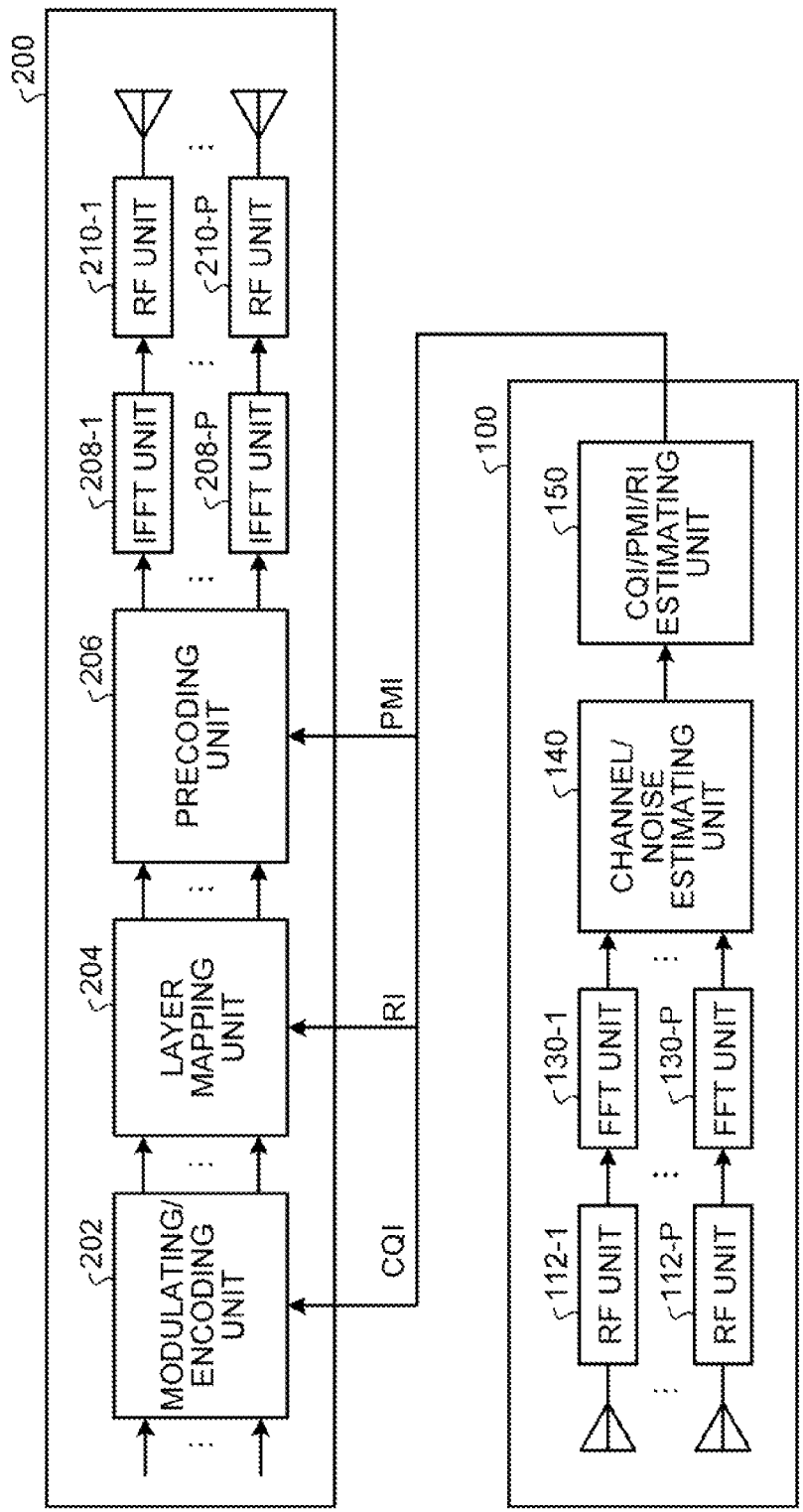
FIG. 1 is a diagram illustrating an example of a configuration of a wireless communication system.

FIG. 1 is a diagram illustrating an example of a configuration of a wireless communication system. As illustrated in FIG. 1, the wireless communication system includes a wireless device (for example, a base station) 200 at a transmitting station and a wireless device (for example, a portable telephone) 100 at a receiving station that receives a radio signal transmitted from the wireless device 200.

The wireless device 100 estimates an optimal CQI/PMI/RI based on the radio signal transmitted from the wireless device 200, and feeds the estimated optimal CQI/PMI/RI back to the wireless device 200. The wireless device 200 generates a transmission signal based on the fed-back CQI/PMI/RI. Here, the CQI is a value used for the wireless device 200 to decide a modulation scheme and a coding rate, and the PMI is a value used for the wireless device 200 to apply a weight in order to increase a signal gain in the wireless device 100. The RI is a value corresponding to the number of transmission streams of the radio signal.

As illustrated in FIG. 1, the wireless device 200 includes a modulating/encoding unit 202, a layer mapping unit 204, and a precoding unit 206. The wireless device 200 further includes IFFT (Inverse Fast Fourier Transform) units 208-1 to 208-P (P represents the number of antenna ports), and RF (Radio Frequency) units 210-1 to 210-P.

The modulating/encoding unit 202 encodes transmission data using an error correction code such as a turbo code based on the fed-back CQI, and executes digital modulation such as QPSK (Quadrature Phase Shift Keying) or QAM (Quadrature Amplitude Modulation) on the encoded data. Here, in the LTE system, a coding rate or a modulation scheme of error correction is controlled for each codeword.

The layer mapping unit 204 maps a codeword to a layer. For example, when the number of codewords is 2 and the number of layers is 4, a codeword no. 1 is mapped to layer nos. 1 and 2, and a codeword no. 2 is mapped to layer nos. 2 and 3. As described above, a transmission data vector of an appropriate size is generated based on the fed-back RI. The generated transmission data vector d is represented by a column vector of r×1 as in Formula (1). Here, r represents a rank.

$$d = \begin{bmatrix} d_1 \\ d_2 \\ \vdots \\ d_r \end{bmatrix} \quad (1)$$

The precoding unit 206 executes precoding on the vector d based on the fed-back PMI. In the LTE system, a precoding matrix W(r, i) (a matrix of Ntx×r, where Ntx represents the number of transmitting antennas) is decided in advance as a system (a plurality of precoding matrices are prepared for each rank and are called a codebook). A certain precoding matrix in a codebook is multiplied, and so W(r, i) d is transmitted through the transmitting antenna. W(r, i) d is generated for each sub carrier.

Each of the IFFT units 208-1 to 208-P generates an OFDM (Orthogonal Frequency Division Multiplexing) signal by performing IFFT and adding a CP (Cyclic Prefix).

Each of the RF units 210-1 to 210-P performs DA (Digital to Analog) conversion on the signal generated by each of the IFFT units 208-1 to 208-P to be up-converted to a radio frequency band, and transmits the converted signal through an antenna.

Meanwhile, the wireless device 100 includes RF units 112-1 to 112-P, FFT units 130-1 to 130-P, a channel/noise estimating unit 140, and a CQI/PMI/RI estimating unit 150.

The RF units 112-1 to 112-P perform down-conversion from a radio frequency band to a base band on a radio signal received through an antenna after passing through a propagation path matrix that connects the wireless device 200 with the wireless device 100, and perform AD (Analog to Digital) conversion to obtain a digital signal.

The FFT units 130-1 to 130-P remove a CP (Cyclic Prefix), and then perform FFT (Fourier Trans Form) to obtain reception signal data of each sub carrier. The signal at this time is HW(r, i) d+n when H is a propagation path matrix of a certain sub carrier in a frequency domain and n is a noise vector. Here, an optimal modulation scheme/coding rate of the transmission data vector d, an index i of the optimal precoding matrix W(r, i), and an optimal size r of the transmission data vector d change according to the propagation path matrix H and the noise vector n. In the LTE system, the above information is estimated by the wireless device 100 which is the receiving station, and fed back to the wireless device 200 which is the transmitting station as the CQI, the PMI, and the RI. The wireless device 200 which is the transmitting station performs optimal CQI/PMI/RI control using the fed-back information.

The channel/noise estimating unit 140 estimates a channel matrix based on the radio signal transmitted from the wireless device 200. For example, the channel/noise estimating unit 140 estimates a propagation path value and noise power of each sub carrier from a known signal such as a pilot signal, and outputs all propagation path values and noise power estimation values between the transmission side and the reception side to the CQI/PMI/RI estimating unit 150. For example, the channel matrix estimated by the channel/noise estimating unit 140 is represented by Formula (2) which will be described later.

The CQI/PMI/RI estimating unit 150 estimates optimal CQI/PMI/RI based on the propagation path value and the noise power of each sub carrier output from the channel/noise estimating unit 140, and feeds the estimated optimal CQI/PMI/RI to the wireless device 100. The details of the CQI/PMI/RI estimating unit 150 will be described later.

Meanwhile, in this wireless communication system, it is preferred to reduce the computation cost in PMI estimation. In other words, in the LTE-A that implements higher-speed communication than the LTE, the precoding matrix W is implemented by a combination of two types of $W_1$ and $W_2$ like $W=W_1W_2$, and the number of PMIs is more than in the LTE.

Figures 2, 3:
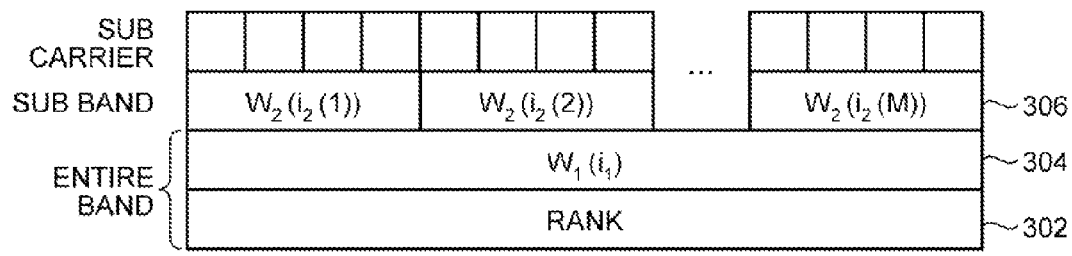
FIG. 2 is a diagram illustrating an example of the number of PMIs in the LTE and the LTE-A.
FIG. 3 is a diagram illustrating an example of a control band of a first precoding matrix and a second precoding matrix.

FIG. 2 is a diagram illustrating an example of the number of PMIs in the LTE and the LTE-A. As illustrated in FIG. 2, in the LTE, there are ranks 1 to 4, and each of the ranks 1 to 4 includes 16 precoding matrices W. On the other hand, in the LTE-A, the precoding matrix W is implemented by a combination of two types of $W_1$ and $W_2$. Further, in the LTE-A, there are ranks 1 to 8, the rank 1 includes 16 precoding matrices $W_1$ and 16 precoding matrices $W_2$, and so the number of precoding matrices W is 256. Similarly, in the LTE-A, the number of precoding matrices W of the rank 2 is 256, the number of precoding matrices W of the rank 3 is 64, and the number of precoding matrices W of the rank 4 is 32. Further, in the LTE-A, the number of precoding matrices W of the rank 5 is 4, the number of precoding matrices W of the rank 6 is 4, the number of precoding matrices W of the rank 7 is 4, and the number of precoding matrices W of the rank 8 is 1. Thus, compared to the LTE, the number of PMIs of the LTE-A increases to be 16 times in ranks 1 and 2, 4 times in a rank 3, and twice in a rank 4, and ranks 5 to 8 are newly added. Thus, in the technique of calculating a metric on all of PMIs and ranks for each sub carrier, the computation cost (processing amount) may enormously increase.

Further, in the LTE-A system, for example, a first precoding matrix $W_1$ and a second precoding matrix $W_2$ and the rank are controlled. FIG. 3 is a diagram illustrating an example of a control band of a first precoding matrix and a second precoding matrix.

As illustrated in FIG. 3, for example, in the LTE-A system, a second precoding matrix 306 is controlled in units of sub carrier groups which each is called a sub band in which a plurality of sub carriers tied together, and a first precoding matrix 304 and a rank 302 are controlled in an entire band. In other words, the first precoding matrix 304 is a precoding matrix which is common to a plurality of bands, and the second precoding matrix 306 is a precoding matrix of a band unit.

Figure 4:
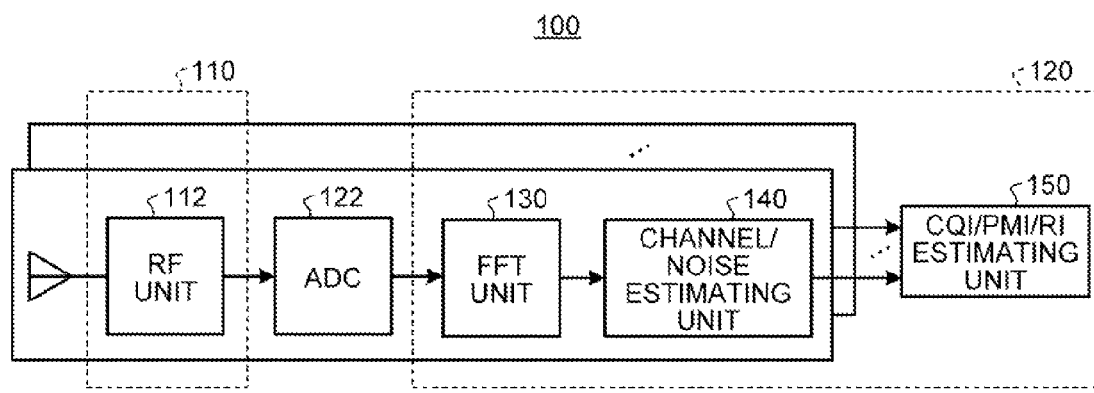
FIG. 4 is a diagram illustrating an example of an overall configuration of a wireless device.

FIG. 4 is a diagram illustrating an example of an overall configuration of a wireless device. As illustrated in FIG. 4, the wireless device 100 includes an RF block 110 and a BB (Base Band) block 120. The RF block 110 includes an RF unit 112. The BB block 120 includes an FFT unit 130, the channel/noise estimating unit 140, and the CQI/PMI/RI estimating unit 150. An ADC (analog-to-digital converter) 122 is provided between the RF block 110 and the BB block 120. The RF unit 112, the FFT unit 130, and the channel/noise estimating unit 140 are the same as those described with reference to FIG. 1, and thus the redundant description thereof will not be repeated.

The ADC 122 converts an analog signal output from the RF unit 112 into a digital signal, and outputs the digital signal to the FFT unit 130. The RF block 110 is mainly configured with an analog circuit. The BB block 120 is configured with a digital circuit, a DSP (Digital Signal Processor), a CPU (Central Processing Unit), or the like.

Figure 5:
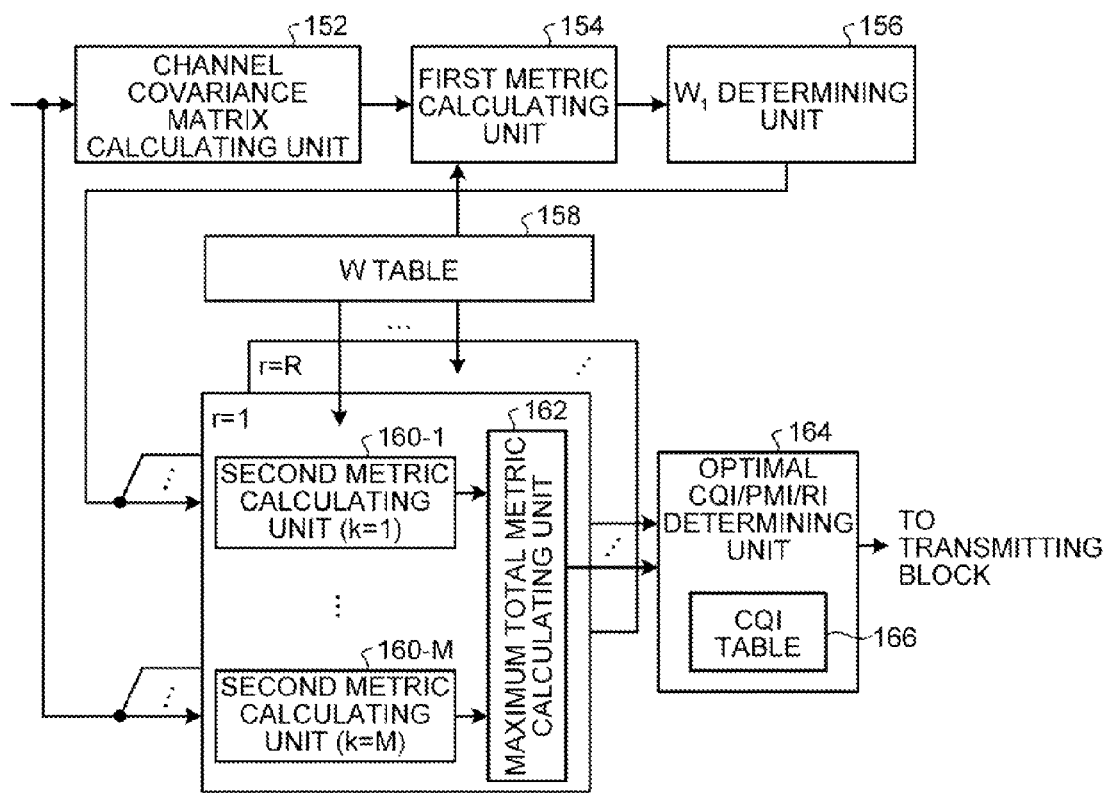
FIG. 5 is a diagram illustrating a configuration of a first embodiment of a CQI/PMI/RI estimating unit.

Next, the CQI/PMI/RI estimating unit 150 of a first embodiment will be described. FIG. 5 is a diagram illustrating a configuration of the first embodiment of the CQI/PMI/RI estimating unit. As illustrated in FIG. 5, the CQI/PMI/RI estimating unit 150 includes a channel covariance matrix calculating unit 152, a first metric calculating unit 154, a $W_1$ determining unit 156, and a W table 158. The CQI/PMI/RI estimating unit 150 further includes second metric calculating units 160-1 to 160-M (M represents the number of sub carriers), a maximum total metric calculating unit 162, and an optimal CQI/PMI/RI determining unit 164. The optimal CQI/PMI/RI determining unit 164 includes a CQI table 166 in which a CQI is decided corresponding to each of a plurality of channel capacities. The second metric calculating units 160-1 to 160-M and the maximum total metric calculating unit 162 are provided in units of a plurality of ranks r.

A channel estimation value (channel matrix) of each sub carrier connecting a transmitting station with a receiving station is input from the channel/noise estimating unit 140 to the channel covariance matrix calculating unit 152. For example, a channel estimation matrix of a sub carrier k is represented by Formula (2):

$$H(k) = \begin{bmatrix} h_{11}(k) & h_{12}(k) & \ldots & h_{1N_{tx}}(k) \\ h_{21}(k) & h_{22}(k) & \ldots & h_{2N_{tx}}(k) \\ \vdots & \vdots & \ddots & \vdots \\ h_{N_{rx}1}(k) & h_{N_{rx}2}(k) & \ldots & h_{N_{rx}N_{tx}}(k) \end{bmatrix} \quad (2)$$

Here, $h_{ij}$ represents a channel estimation value between a transmitting antenna j and a receiving antenna i, $N_{tx}$ represents the number of transmitting antennas of a transmitting station, and $N_{rx}$ represents the number of receiving antennas of a receiving station. In other words, the channel estimation matrix H(k) is a matrix of $N_{rx} \times N_{tx}$.

The channel covariance matrix calculating unit 152 calculates a covariance matrix based on a channel matrix estimated by the channel/noise estimating unit 140. For example, the channel covariance matrix calculating unit 152 calculates Formula (3).

$$\Gamma = \frac{1}{M} \sum_{k=1}^{M} (H(k))^H H(k) \quad (3)$$

Here, M represents the number of sub carriers, and H represents a complex conjugate transpose. In the above process, averaging in a frequency direction at a certain time is performed, but averaging in a time direction may be performed using a channel estimation matrix related to a plurality of times.

Next, the first metric calculating unit 154 calculates a first metric based on the covariance matrix calculated by the channel covariance matrix calculating unit 152. For example, the first metric calculating unit 154 calculates Formula (4) using the matrix $\Gamma$ of $N_{rx} \times N_{tx}$ and the first precoding matrix $W_1(r, i_1)$ calculated above.

$$d(r,i_1) = tr\{W_1(r,i_1)^H \Gamma W_1(r,i_1)\} \quad (4)$$

Here, tr{X} represents a trace of a matrix X. $W_1(r, i_1)$ is a precoding matrix related to (rank: r, PMI: $i_1$) and is prepared in the W table 158 in advance. For example, in case of "$W_1$" illustrated in FIG. 2, the number of patterns $i_1$ is 16 when r is 1 and 2, 4 when r is 3 to 7, and 1 when r is 8. Thus, in this case, $d(r, i_1)$ is calculated as 16+16+4+4+4+4+4+1=53.

The first metric calculating unit 154 may calculate Formula (5) instead of Formula (4) as the metric $d(r, i_1)$.

$$d(r,i_1) = tr\{W_1(r,i_1)^H \Gamma W_1(r,i_1) E[W_2(r,i_2) W_2(r,i_2)^H]_{i_2}\} \quad (5)$$

Here, Formula (6) is a mean value matrix of $N_{W2}(r)$ second precoding matrices as represented in Formula (7) and is defined as a codebook in advance as a system. Formula (6) is calculated in advance and prepared in the W table 158.

$$E[W_2(r,i_2) W_2(r,i_2)^H] \quad (6)$$

$$E[W_2(r, i_2)W_2(r, i_2)^H]_{i_2} = \frac{1}{N_{W2}(r)} \sum_{i_2=1}^{N_{W2}(r)} W_2(r, i_2)W_2(r, i_2)^H \quad (7)$$

The first metric calculating unit 154 may calculates a channel capacity as the metric $d(r, i_1)$. For example, the first metric calculating unit 154 calculates the following Formula (8) using the matrix $\Gamma$ when MMSE (Minimum Mean Square Error) is assumed as a MIMO (Multiple Input and Multiple Output) demodulation method. The present embodiment is described in connection with MIMO wireless communication in which both the wireless device 100 and the wireless device 200 uses a plurality of antennas but not limited to this example. For example, the present embodiment can be similarly applied to SIMO (Single Input and Multi Output) wireless communication or MISO (Multi Input and Single Output) wireless communication in which either of the wireless device 200 and the wireless device 100 includes a single antenna.

$$d(r, i_1) = \max_{i_2} \sum_{l=1}^{r} \log_2 \frac{1}{\sigma^{-2}(\sigma^2 I_{r \times r} + W_2(r, i_2)^H W_1(r, i_1)^H \Gamma W_1(r, i_1) W_2(r, i_2))_{l,l}^{-1}} \quad (8)$$

The $W_1$ determining unit 156 calculates a first precoding matrix common to a plurality of bands based on the first metric calculated by the first metric calculating unit 154. For example, the $W_1$ determining unit 156 determines a PMI of the optimal $W_1$ of each rank r by the following Formula (9) using $d(r, i_1)$.

$$\hat{i}_1(r) = \underset{i_1}{\mathrm{argmax}}\, d(r, i_1) \quad (9)$$

The second metric calculating units 160-1 to 160-M calculate a second metric using the first precoding matrix calculated by the $W_1$ determining unit 156. For example, the second metric calculating units 160-1 to 160-M calculate a metric in each sub carrier using $\hat{i}_1(r)$ which is the determination result of Formula (9). In this disclosure, for convenience of description, a character X with a hat symbol is written as ˆX. The second metric calculating unit 160-1 in which r is 1 in FIG. 5 calculates a metric in which a sub carrier rank r is 1, and a sub carrier k is 1. For example, channel capacity is used as the metric. The second metric calculating units 160-1 to 160-M calculate channel capacity of each layer: 1 by Formula (10) when MMSE is used as a MIMO modulation method.

$$C_{sc}^{layer}(k, r, l, \hat{i}_1(r), i_2) = \log_2 \frac{1}{\sigma^{-2}(k)(\sigma^2(k)I_{r \times r} + B(k, r, \hat{i}_1(r), i_2))_{l,l}^{-1}} \quad (10)$$

Here, $\sigma^2(k)$ represents noise power of a sub carrier k, $I_{r \times r}$ represents a unit matrix of r×r, $(X)^{-1}_{l,l}$ represents a (l, 1) element of an inverse matrix of a matrix X. The second metric calculating units 160-1 to 160-M calculate a matrix B by the following Formulae (11) and (12).

$$B(k,r,\hat{i}_1(r),i_2) = A(k,r,\hat{i}_1(r),i_2)^H A(k,r,\hat{i}_1(r),i_2) \quad (11)$$

$$A(k,r,\hat{i}_1(r),i_2) = H(k)W_1(r,\hat{i}_1(r))W_2(r,i_2) \quad (12)$$

For example, when the sub carrier rank r is 1 and the sub carrier k is 1, the channel capacity is calculated on only the number of patterns of PMI: $i_2$ of $W_1$ since a PMI of $W_1$ is determined as $\hat{i}_1(r)$. In the example of FIG. 2, in the related art, when r is 1, 256=16 (the number of patterns of $i_1$)×16 (the number of patterns of $i_2$) has to be calculated, whereas in the present embodiment, only 16 (the number of patterns of $i_2$) is calculated since $i_1$ has been already decided. The second metric calculating units 160-1 to 160-M execute this calculation on each sub carrier k (k=1 to M), and executes this calculation on all considered ranks (r=1 to R). In the present embodiment, the second metric calculating units 160-1 to 160-M which are executed on a plurality of sub carriers and a plurality of ranks are provided corresponding to the number of patterns of $i_2$, and thus the computation cost can be reduced compared to the conventional technique that performs a full search.

The maximum total metric calculating unit 162 calculates Formulae (13) and (14).

$$C_{sc}^{rank}(k, r, \hat{i}_1(r), i_2) = \sum_{l=1}^{r} C_{sc}^{layer}(k, r, l, \hat{i}_1(r), i_2) \quad (13)$$

$$C_{bw}^{rank}(r) = \sum_{k=1}^{M} \max_{i_2} C_{sc}^{rank}(k, r, \hat{i}_1(r), i_2) \quad (14)$$

As represented in Formula (13), the maximum total metric calculating unit 162 adds channel capacity of all layers: 1. Then, the maximum total metric calculating unit 162 calculates a channel capacity $C^{rank}_{bw}(r)$ by adding channel capacity values of respective sub carriers which are largest among $i_2$ channel capacities in all sub carriers.

The optimal CQI/PMI/RI determining unit 164 calculates a second precoding matrix of each band based on the second metric calculated by the second metric calculating units 160-1 to 160-M. For example, the optimal CQI/PMI/RI determining unit 164 searches for a rank r in which $C^{rank}_{bw}(r)$ is largest among all ranks r by the following Formula (15) and uses the searched rank as a determination rank ˆr.

$$\hat{r} = \underset{r}{\mathrm{argmax}}\, C_{bw}^{rank}(r) \quad (15)$$

The optimal CQI/PMI/RI determining unit 164 selects $\hat{i}_1(\hat{r})$ as a first PMI. The optimal CQI/PMI/RI determining unit 164 determines a second PMI for each sub carrier k by the following Formula (16).

$$\hat{i}_2(k) = \max_{i_2} C_{sc}^{rank}(k, \hat{r}, \hat{i}_1(\hat{r}), i_2) \quad (16)$$

The optimal CQI/PMI/RI determining unit 164 decides a CQI using the following Formula (17). For example, the optimal CQI/PMI/RI determining unit 164 calculates Formula (18) when a CQI is decided for each layer: 1. Then, the optimal CQI/PMI/RI determining unit 164 decides a CQI of each layer 1 using the calculated channel capacity and the CQI table 166.

$$C_{sc}^{layer}(k,\hat{r},l,\hat{i}_1(\hat{r}),\hat{i}_2(k)) \tag{17}$$

$$C_{bw}^{layer}(l) = \frac{1}{M}\sum_{k=1}^{M} C_{sc}^{layer}(k,\hat{r},l,\hat{i}_1(\hat{r}),\hat{i}_2(k)) \tag{18}$$

In the above example, the process is performed for each sub carrier, but it can be implemented using a similar concept even when a search of $W_2$ is performed for each sub band represented as a group of a plurality of sub carriers as illustrated in FIG. 3.

Figure 6:
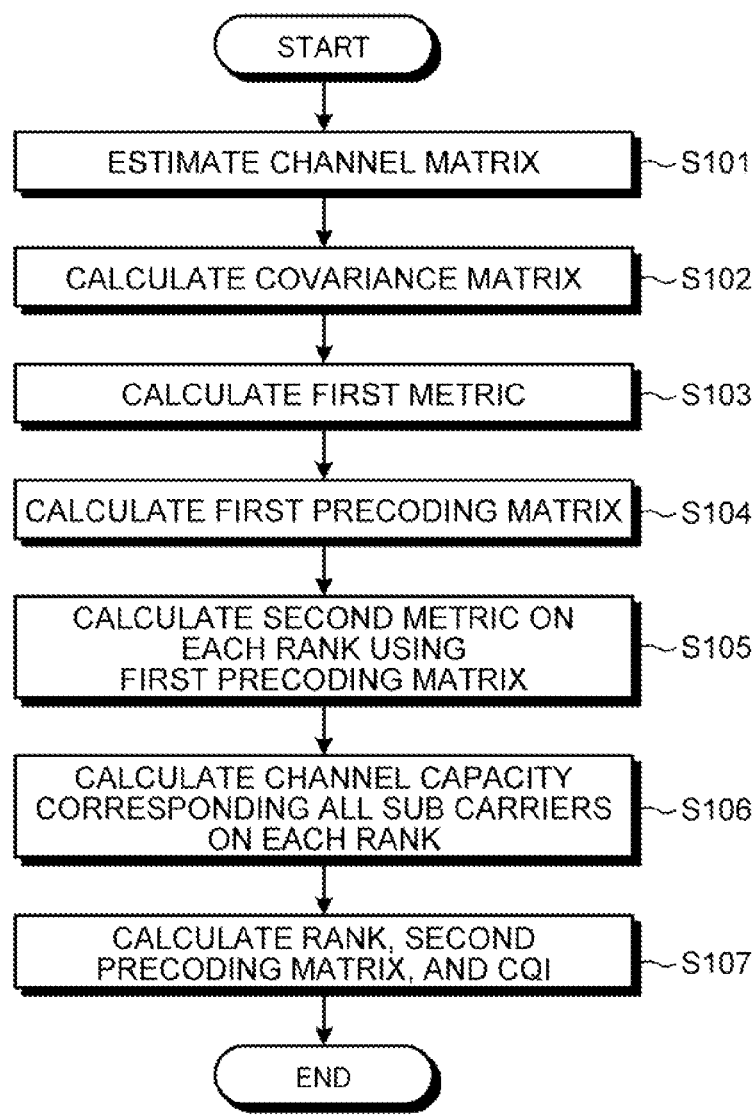
FIG. 6 is a flowchart of a process of a wireless device including the CQI/PMI/RI estimating unit of the first embodiment.

Next, the flow of a process of the wireless device 100, particularly, the flow of a process of the CQI/PMI/RI estimating unit 150 of the first embodiment will be described. FIG. 6 is a flowchart of a process of a wireless device including the CQI/PMI/RI estimating unit of the first embodiment.

As illustrated in FIG. 6, first, the channel/noise estimating unit 140 estimates a channel matrix based on the radio signal transmitted from the wireless device 200, for example, using Formula (2) (step S101). Then, the channel covariance matrix calculating unit 152 calculates a covariance matrix based on the channel matrix estimated by the channel/noise estimating unit 140, for example, using Formula (3) (step S102).

Then, the first metric calculating unit 154 calculates a first metric based on the covariance matrix calculated by the channel covariance matrix calculating unit 152, for example, using Formulae (4), (5), or (8) (step S103). Subsequently, the $W_1$ determining unit 156 calculates a first precoding matrix common to a plurality of bands based on the first metric calculated by the first metric calculating unit 154, for example, using Formula (9) (step S104).

Subsequently, the second metric calculating units 160-1 to 160-M calculate a second metric using the first precoding matrix calculated by the $W_1$ determining unit 156 (step S105). The second metric calculating units 160-1 to 160-M calculate the second metric, for example, using Formulae (10) to (12).

Subsequently, the maximum total metric calculating unit 162 calculates a channel capacity by adding largest channel capacity values of respective sub carrier in all sub carriers based on the second metric calculated by the second metric calculating units 160-1 to 160-M (step S106). The maximum total metric calculating unit 162 adds channel capacities of all layers, for example, using Formula (13). Then, the maximum total metric calculating unit 162 adds channel capacity values of respective sub carriers which are largest among $i_2$ channel capacities in all sub carriers to calculate a channel capacity $C^{rank}_{bw}(r)$, for example, using Formula (14). The second metric calculating units 160-1 to 160-M and the maximum total metric calculating unit 162 execute the same process for each rank.

Subsequently, the optimal CQI/PMI/RI determining unit 164 calculates a rank, a second precoding matrix, and a CQI based on the channel capacity corresponding to all sub carriers calculated by the maximum total metric calculating unit 162 in each rank (step S107). For example, the optimal CQI/PMI/RI determining unit 164 searches for a rank in which $C^{rank}_{bw}(r)$ is largest among all ranks r, for example, using the following Formula (15) and uses the searched rank as a determination rank. The optimal CQI/PMI/RI determining unit 164 calculates a second precoding matrix of each sub carrier, for example, using Formula (16). Further, the optimal CQI/PMI/RI determining unit 164 decides a CQI of each layer using the channel capacity calculated, for example, using Formula (18) and the CQI table 166.

[b] Second Embodiment

Figure 7:
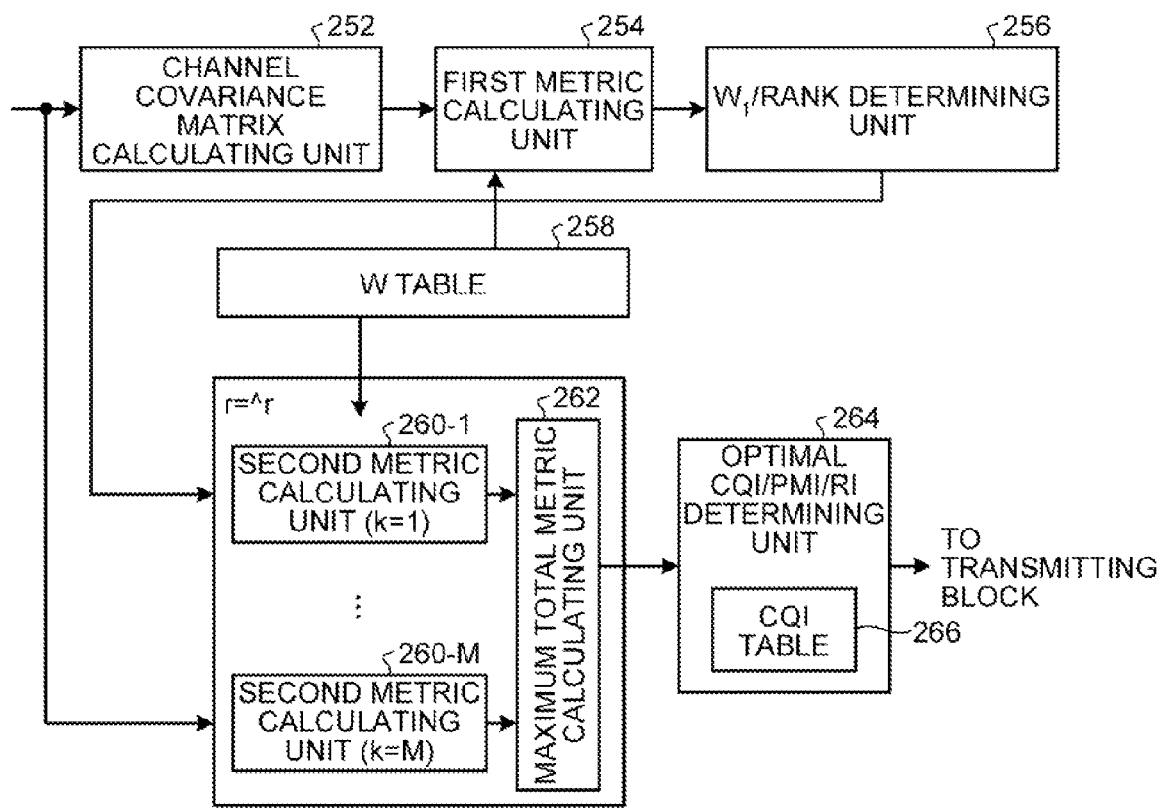
FIG. 7 is a diagram illustrating a configuration of a second embodiment of a CQI/PMI/RI estimating unit.

Next, a second embodiment of the CQI/PMI/RI estimating unit will be described. FIG. 7 is a diagram illustrating a configuration of the second embodiment of the CQI/PMI/RI estimating unit. The second embodiment is different from the first embodiment in that a $W_1$/rank determining unit 256 determines a rank as well as $W_1$. The redundant description on the same configuration as in the first embodiment will not be repeated.

As illustrated in FIG. 7, a CQI/PMI/RI estimating unit 150 includes a channel covariance matrix calculating unit 252, a first metric calculating unit 254, the $W_1$/rank determining unit 256, and a W table 258. The CQI/PMI/RI estimating unit 150 further includes second metric calculating units 260-1 to 260-M (M represents the number of sub carriers), a maximum total metric calculating unit 262, and an optimal CQI/PMI/RI determining unit 264. The optimal CQI/PMI/RI determining unit 264 includes a CQI table 266 in which a CQI is decided corresponding to each of a plurality of channel capacities. The second metric calculating units 260-1 to 260-M and the maximum total metric calculating unit 262 are provided on only a single rank ^r.

The channel covariance matrix calculating unit 252 calculates a matrix Γ similarly to the first embodiment. The first metric calculating unit 254 calculates a channel capacity when MMSE is assumed as a MIMO modulation method, for example, by the following Formula (19).

$$d(r,i_1) = \max_{i_2} \sum_{l=1}^{r} \log_2 \frac{1}{\sigma^2(\sigma^2 I_{r \times r} + W_2(r,i_2)^H W_1(r,i_1)^H \Gamma W_1(r,i_1)W_2(r,i_2))^{-1}_{l,l}} \tag{19}$$

The $W_1$/rank determining unit 256 calculates a rank representing the number of transmission streams of a radio signal in addition to the first precoding matrix. For example, the $W_1$/rank determining unit 256 determines a rank and a PMI of $W_1$ based on the following Formula (20) using the metric calculated by Formula (19).

$$(\hat{r},\hat{i}_1) = \underset{r,i_1}{\operatorname{argmax}} d(r,i_1) \tag{20}$$

The second metric calculating units 260-1 to 260-M calculate a second metric using the first precoding matrix and the rank calculated by the $W_1$/rank determining unit 256. The second metric calculating units 260-1 to 260-M perform the calculation on only the rank ^r determined above. For example, the second metric calculating units 260-1 to 260-M calculate a metric by the following Formulae (21), (22), and (23) using the determined first precoding matrix indicator $\hat{i}_1$.

$$C_{sc}^{layer}(k,\hat{r},l,\hat{i}_1,i_2) = \log_2 \frac{1}{\sigma^2(k)(\sigma^2(k)I_{r \times \hat{r}} + B(k,\hat{r},\hat{i}_1,i_2))^{-1}_{l,l}} \tag{21}$$

$$B(k,\hat{r},\hat{i}_1,i_2) = A(k,\hat{r},\hat{i}_1,i_2)^H A(k,\hat{r},\hat{i}_1,i_2) \tag{22}$$

$$A(k,\hat{r},\hat{i}_1,i_2) = H(k)W_1(\hat{r},\hat{i}_1)W_2(\hat{r},i_2) \tag{23}$$

In the present embodiment, since a rank as well as a PMI of $W_1$ is determined before a metric of each sub carrier is calculated, the processing amount on the metric calculation of each sub carrier is lower than in the first embodiment.

The maximum total metric calculating unit 262 adds channel capacities of all layers using the second metric calculated by the second metric calculating units 260-1 to 260-M. For example, the maximum total metric calculating unit 262 calculates the following Formula (24).

$$C_{sc}^{rank}(k, \hat{r}, \hat{i}_1, i_2) = \sum_{l=1}^{\hat{r}} C_{sc}^{layer}(k, \hat{r}, l, \hat{i}_1, i_2) \tag{24}$$

Then, the optimal CQI/PMI/RI determining unit 264 outputs the rank $\hat{r}$ determined already and $\hat{i}_1$ which is the first PMI to the transmitting unit as a determination result. Further, the optimal CQI/PMI/RI determining unit 264 determines a second PMI for each sub carrier k by the following Formula (25).

$$\hat{i}_2(k) = \max_{i_2} C_{sc}^{rank}(k, \hat{r}, \hat{i}_1, i_2) \tag{25}$$

Further, the optimal CQI/PMI/RI determining unit 264 decides a CQI, for example, using the following Formula (26). For example, when a CQI is decided for each layer 1, the optimal CQI/PMI/RI determining unit 264 calculates the following Formula (27) and decides a CQI of each layer 1 using the channel capacity and the previously prepared CQI table 266.

$$C_{sc}^{layer}(k,\hat{r},l,\hat{i}_1(\hat{r}),\hat{i}_2(k)) \tag{26}$$

$$C_{bw}^{layer}(l) = \frac{1}{M}\sum_{k=1}^{M} C_{sc}^{layer}(k, \hat{r}, l, \hat{i}_1, \hat{i}_2(k)) \tag{27}$$

Figure 8:
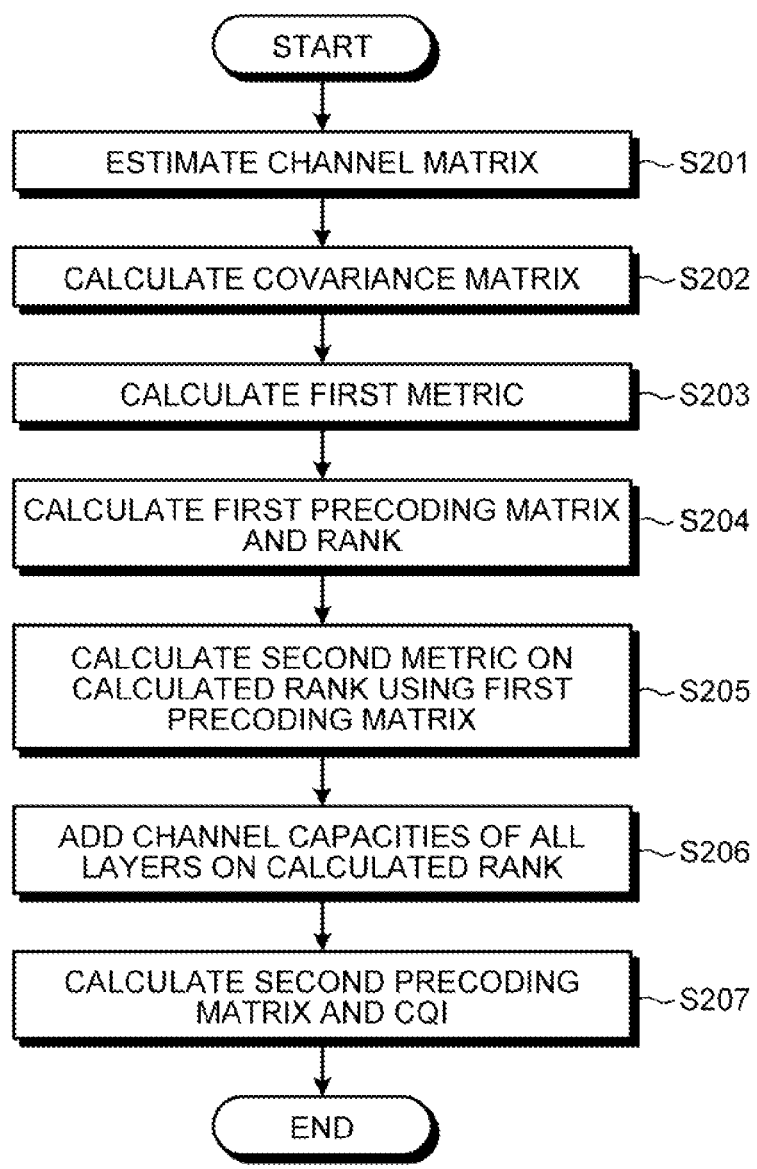
FIG. 8 is a flowchart of a process of a wireless device including the CQI/PMI/RI estimating unit of the second embodiment.

Next, the flow of a process of the wireless device 100, particularly, the flow of a process of the CQI/PMI/RI estimating unit 150 of the second embodiment will be described. FIG. 8 is a flowchart of a process of a wireless device including the CQI/PMI/RI estimating unit of the second embodiment.

As illustrated in FIG. 8, first, the channel/noise estimating unit 140 estimates a channel matrix based on the radio signal transmitted from the wireless device 200, for example, using Formula (2) (step S201). Then, the channel covariance matrix calculating unit 252 calculates a covariance matrix based on the channel matrix estimated by the channel/noise estimating unit 140, for example, using Formula (3) (step S202).

Then, the first metric calculating unit 254 calculates a first metric based on the covariance matrix calculated by the channel covariance matrix calculating unit 252, for example, using Formula (19) (step S203). Subsequently, the $W_1$/rank determining unit 256 calculates a first precoding matrix common to a plurality of bands and a single rank based on the first metric calculated by the first metric calculating unit 254, for example, using Formula (20) (step S204).

Subsequently, the second metric calculating units 260-1 to 260-M calculate a second metric using the first precoding matrix and the rank calculated by the $W_1$/rank determining unit 256 (step S205). The second metric calculating units 260-1 to 260-M calculate the second metric on only the calculated single rank, for example, using Formulae (21) to (23).

Subsequently, the maximum total metric calculating unit 262 calculates a channel capacity by adding largest channel capacity values of respective sub carrier in all sub carriers based on the second metric calculated by the second metric calculating units 260-1 to 260-M (step S206). The maximum total metric calculating unit 262 adds channel capacities of all layers, for example, using Formula (24).

Subsequently, the optimal CQI/PMI/RI determining unit 264 calculates a second precoding matrix and a CQI based on the channel capacity corresponding to all sub carriers calculated by the maximum total metric calculating unit 262 in the calculated rank (step S207). For example, the optimal CQI/PMI/RI determining unit 264 calculates a second precoding matrix of each sub carrier, for example, using Formula (25). Further, the optimal CQI/PMI/RI determining unit 264 decides a CQI of each layer using the channel capacity calculated, for example, using Formula (27) and the CQI table 266.

[c] Third Embodiment

Figure 9:
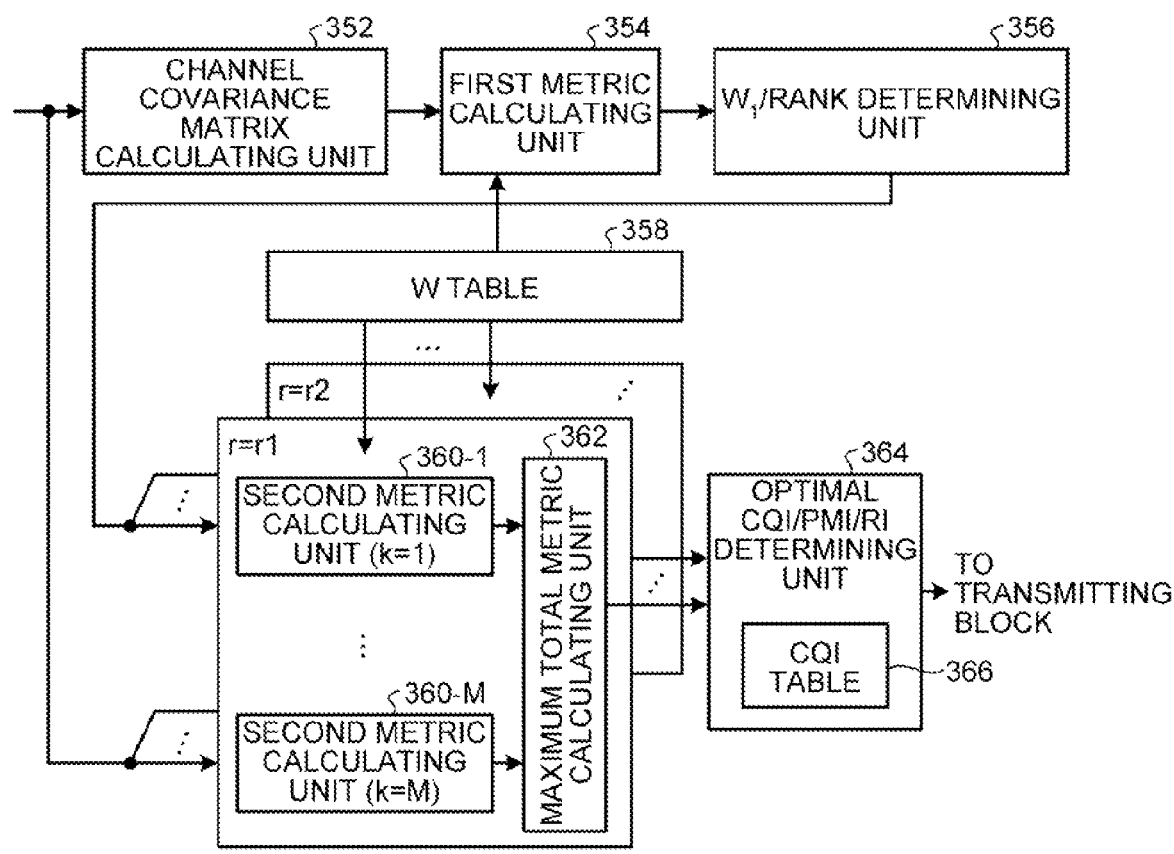
FIG. 9 is a diagram illustrating a configuration of a third embodiment of a CQI/PMI/RI estimating unit.

Next, a third embodiment of the CQI/PMI/RI estimating unit will be described. FIG. 9 is a diagram illustrating a configuration of the third embodiment of the CQI/PMI/RI estimating unit. In the second embodiment, the $W_1$/rank determining unit 256 estimates a single rank. On the other hand, the third embodiment is different from the second embodiment in that a $W_1$/rank determining unit 356 leaves a plurality of rank candidates. The redundant description on the same configuration as in the first and second embodiments will not be repeated.

As illustrated in FIG. 9, the CQI/PMI/RI estimating unit 150 includes a channel covariance matrix calculating unit 352, a first metric calculating unit 354, the $W_1$/rank determining unit 356, and a W table 358. The CQI/PMI/RI estimating unit 150 further includes second metric calculating units 360-1 to 360-M (M represents the number of sub carriers), a maximum total metric calculating unit 362, and an optimal CQI/PMI/RI determining unit 364. The optimal CQI/PMI/RI determining unit 364 includes a CQI table 366 in which a CQI is decided corresponding to each of a plurality of channel capacities. The second metric calculating units 360-1 to 360-M and the maximum total metric calculating unit 362 are provided only on ranks r=1 and r=2.

The channel covariance matrix calculating unit 352 calculates a matrix $\Gamma$ similarly to the first embodiment. The first metric calculating unit 354 calculates the following Formula (28) similarly to the second embodiment.

$$d(r, i_1) = \max_{i_2} \sum_{l=1}^{r} \log_2 \frac{1}{\sigma^2(\sigma^2 I_{r\times r} + W_2(r, i_2)^H W_1(r, i_1)^H \Gamma W_1(r, i_1) W_2(r, i_2))_{1,l}^{-1}} \tag{28}$$

The $W_1$/rank determining unit 356 calculates a plurality of candidate ranks representing the number of transmission streams of a radio signal in addition to the first precoding matrix. For example, the $W_1$/rank determining unit 356 determines a rank by the following Formula (29) using the metric calculated by Formula (28).

$$r_1 = \arg\max_{r}\left\{\max_{i_1} \ d(r, i_1)\right\} \tag{29}$$

The $W_1$/rank determining unit 356 determines a plurality of rank candidates using the rank $r_1$. For example, when two candidates are left, the $W_1$/rank determining unit 356 leaves two rank candidates by the following Formula (30).

$$r_2 = r_1 - 1 \tag{30}$$

Here, since $r_1$ and $r_2$ are numbers equal to or more than 1, when $r_1$ is 1, the $W_1$/rank determining unit 356 sets $r_2$ to 2. In the above example, $r_1$ is a rank having a value smaller by 1, but $r_1$ may be a rank having a value larger by 1 or a rank smaller or larger by 2 or more. In the above example, two candidates are left, but three or more candidates may be left.

As described above, when $r_1$ and $r_2$ are selected as rank candidates, the $W_1$/rank determining unit 356 determines first PMIs related to $r_1$ and $r_2$ using the following Formulae (31) and (32), respectively.

$$i_1(r_1) = \arg\max_{i_1} d(r_1, i_1) \tag{31}$$

$$i_1(r_2) = \arg\max_{i_1} d(r_1, i_1) \tag{32}$$

The $W_1$/rank determining unit 356 outputs $r_1, r_2, i_1(r_1)$, and $i_1(r_2)$ to a subsequent processing block.

The second metric calculating units 360-1 to 360-M calculate a second metric using the first precoding matrix and a plurality of candidate ranks calculated by the $W_1$/rank determining unit 356. The second metric calculating units 360-1 to 360-M execute processing only on the ranks $r_1$ and $r_2$ determined above. For example, the second metric calculating units 360-1 to 360-M calculate a metric by the following Formula (33) using the determined first precoding matrix indicators $i_1(r_1)$ and $i_1(r_2)$.

$$C_{sc}^{layer}(k, r, l, i_1, (r), i_2) = \log_2 \frac{1}{\sigma^2(k)(\sigma^2(k)I_{\hat{r}\times\hat{r}} + B(k, r, i_1(r), i_2))^{-1}_{l,l}} \tag{33}$$

Here, $r$ and $i_1(r)$ in Formula (33) are obtained as in the following Formulae (34) and (35), respectively.

$$r \in \{r_1, r_2\} \tag{34}$$

$$i_1(r) \in \{i_1(r_1), i_2(r_2)\} \tag{35}$$

The maximum total metric calculating unit 362 calculates the following Formulae (36) and (37). The maximum total metric calculating unit 362 adds channel capacities of all layers: 1 as represented by Formula (36). Then, the maximum total metric calculating unit 362 calculates a channel capacity $C^{rank}_{bw}(r)$ by adding channel capacity values of respective sub carriers which are largest among $i_2$ channel capacities in all sub carriers as represented by Formula (37).

$$C_{sc}^{rank}(k, r, i_1(r), i_2) = \sum_{l=1}^{r} C_{sc}^{layer}(k, r, l, i_1(r), i_2) \tag{36}$$

$$C_{bw}^{rank}(r) = \sum_{k=1}^{M} \max_{i_2} C_{sc}^{rank}(k, r, i_1(r), i_2) \tag{37}$$

The optimal CQI/PMI/RI determining unit 364 calculates a rank from among a plurality of candidate ranks using the second metric calculated by the second metric calculating units 360-1 to 360-M. Then, the optimal CQI/PMI/RI determining unit 364 calculates a first precoding matrix and a second precoding matrix using the calculated rank. For example, the optimal CQI/PMI/RI determining unit 364 calculates a rank using the following Formula (38).

$$\hat{r} = \arg\max_{r} C_{bw}^{rank}(r) \tag{38}$$

Here, $\hat{r}$ is represented by the following Formula (39) as described above and so selected from either of $r_1$ and $r_2$.

$$r \in \{r_1, r_2\} \tag{39}$$

Thus, the optimal CQI/PMI/RI determining unit 364 calculates a first PMI using the following Formula (40) using the determined rank.

$$\hat{i}_1 = i_1(\hat{r}) \tag{40}$$

Further, the optimal CQI/PMI/RI determining unit 364 determines a second PMI for each sub carrier k by the following Formula (41) using the determination result $\hat{r}$ and $\hat{i}_1$.

$$\hat{i}_2(k) = \max_{i_2} C_{sc}^{rank}(k, \hat{r}, \hat{i}_1, i_2) \tag{41}$$

The optimal CQI/PMI/RI determining unit 364 calculates a CQI, for example, using the following Formula (42). For example, when a CQI is decided for each layer 1, the optimal CQI/PMI/RI determining unit 364 calculates the following Formula (43) and decides a CQI of each layer 1 using the channel capacity and the previously prepared CQI table 366.

$$C_{sc}^{layer}(k, \hat{r}, l, \hat{i}_1(\hat{r}), \hat{i}_2(k)) \tag{42}$$

$$C_{bw}^{layer}(l) = \frac{1}{M}\sum_{k=1}^{M} C_{sc}^{layer}(k, \hat{r}, l, \hat{i}_1, \hat{i}_2(k)) \tag{43}$$

Figure 10:
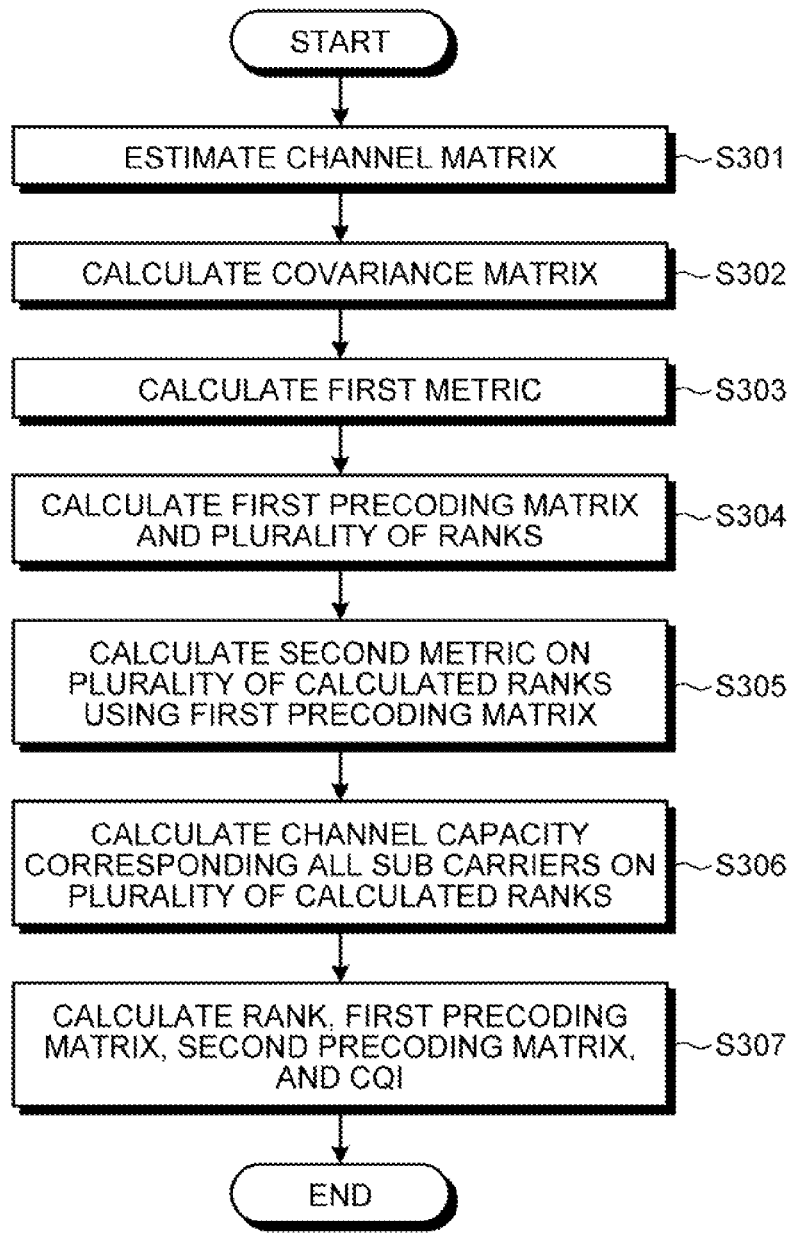
FIG. 10 is a flowchart of a process of a wireless device including the CQI/PMI/RI estimating unit of the third embodiment.

Next, the flow of a process of the wireless device 100, particularly, the flow of a process of the CQI/PMI/RI estimating unit 150 of the third embodiment will be described. FIG. 10 is a flowchart of a process of a wireless device including the CQI/PMI/RI estimating unit of the third embodiment.

As illustrated in FIG. 10, first, the channel/noise estimating unit 140 estimates a channel matrix based on the radio signal transmitted from the wireless device 200, for example, using Formula (2) (step S301). Then, the channel covariance matrix calculating unit 352 calculates a covariance matrix based on the channel matrix estimated by the channel/noise estimating unit 140, for example, using Formula (3) (step S302). Then, the first metric calculating unit 354 calculates a first metric based on the covariance matrix calculated by the channel covariance matrix calculating unit 352, for example, using Formula (28) (step S303). Subsequently, the $W_1$/rank determining unit 356 calculates a first precoding matrix common to a plurality of bands and a plurality of ranks based on the first metric calculated by the first metric calculating unit 354, for example, using Formulae (29) to (32) (step S304).

Subsequently, the second metric calculating units 360-1 to 360-M calculate a second metric using the first precoding matrix and the plurality of ranks calculated by the $W_1$/rank determining unit 356 (step S305). The second metric calculating units 360-1 to 360-M calculate the second metric on the plurality of calculated ranks, for example, using Formula (33).

Subsequently, the maximum total metric calculating unit 362 calculates a channel capacity by adding largest channel capacity values of respective sub carrier in all sub carriers based on the second metric calculated by the second metric calculating units 360-1 to 360-M (step S306). The maximum total metric calculating unit 362 adds channel capacities of all layers, for example, using Formula (36). The maximum total metric calculating unit 362 calculates a channel capacity $C^{rank}_{bw}(r)$ by adding channel capacity values of respective sub carriers which are largest among $i_2$ channel capacities in all sub carriers using Formula (37). The second metric calculating units 360-1 to 360-M and the maximum total metric calculating unit 362 execute the same processing in units of the plurality of calculated ranks.

Subsequently, the optimal CQI/PMI/RI determining unit 364 calculates a rank, a first precoding matrix, a second precoding matrix, and a CQI (step S307). For example, the optimal CQI/PMI/RI determining unit 364 calculates a rank, a first precoding matrix, a second precoding matrix, and a CQI based on the channel capacity corresponding to all sub carriers calculated by the maximum total metric calculating unit 362 in the plurality of calculated ranks. For example, the optimal CQI/PMI/RI determining unit 364 calculates the rank using Formula (38). Further, the optimal CQI/PMI/RI determining unit 364 calculates the first precoding matrix, for example, using Formula (40). Further, the optimal CQI/PMI/RI determining unit 364 calculates the second precoding matrix of each sub carrier, for example, using Formula (41). Further, the optimal CQI/PMI/RI determining unit 364 decides a CQI of each layer using the channel capacity calculated, for example, using Formula (43) and the CQI table 366.

[d] Fourth Embodiment

Figure 11:
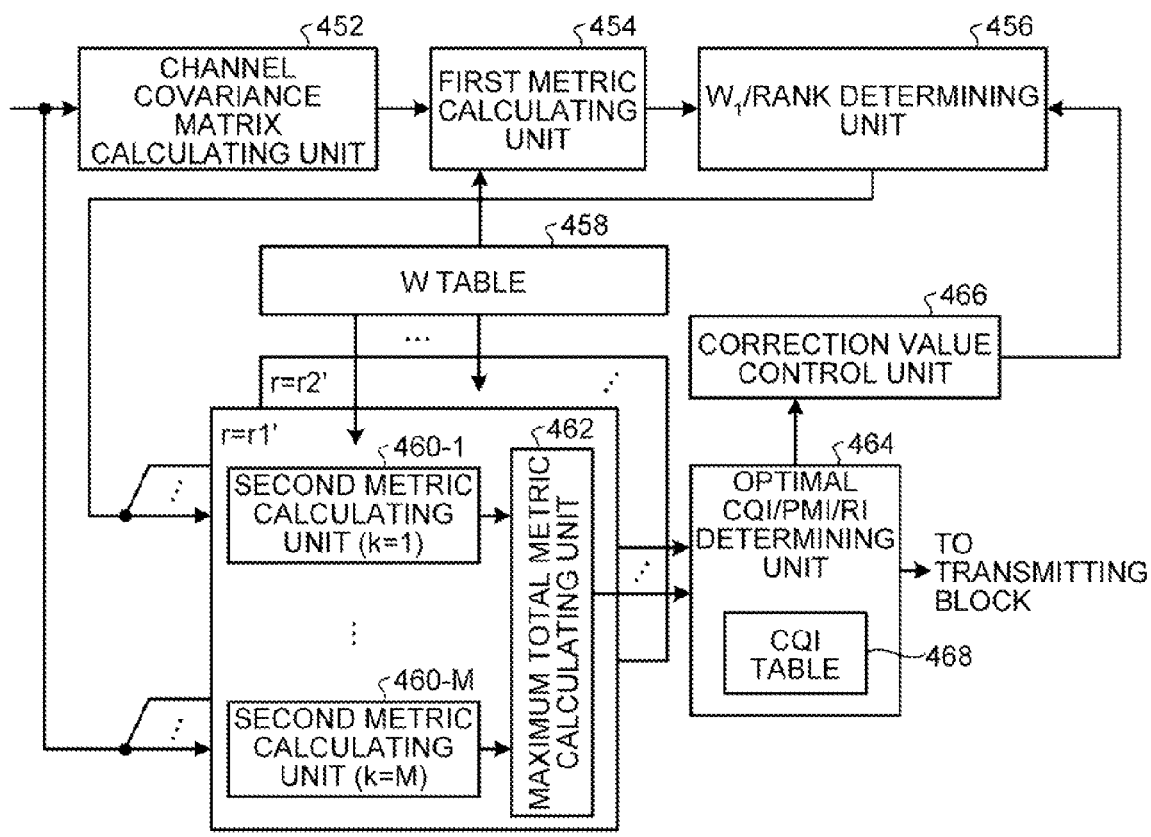
FIG. 11 is a diagram illustrating a configuration of a fourth embodiment of a CQI/PMI/RI estimating unit.

Next, a fourth embodiment of the CQI/PMI/RI estimating unit will be described. FIG. 11 is a diagram illustrating a configuration of the fourth embodiment of the CQI/PMI/RI estimating unit. The fourth embodiment is different from the third embodiment in that a rank is corrected using a finally determined rank. The redundant description on the same configuration as in the first to third embodiments will not be repeated.

As illustrated in FIG. 11, the CQI/PMI/RI estimating unit 150 includes a channel covariance matrix calculating unit 452, a first metric calculating unit 454, a $W_1$/rank determining unit 456, and a W table 458. The CQI/PMI/RI estimating unit 150 further includes second metric calculating units 460-1 to 460-M (M represents the number of sub carriers), a maximum total metric calculating unit 462, an optimal CQI/PMI/RI determining unit 464, and a correction value control unit 466. The optimal CQI/PMI/RI determining unit 464 includes a CQI table 468 in which a CQI is decided corresponding to each of a plurality of channel capacities. The second metric calculating units 460-1 to 460-M and the maximum total metric calculating unit 462 are provided only on ranks $r=r_1'$ and $r=r_2'$.

The channel covariance matrix calculating unit 452 calculates a matrix $\Gamma$ similarly to the first embodiment. The first metric calculating unit 454 calculates Formula (28) similarly to the third embodiment, and the $W_1$/rank determining unit 456 determines the rank $r_1$ by Formula (29) using the metric similarly to the third embodiment.

Here, the $W_1$/rank determining unit 456 corrects a plurality of candidate ranks using a correction value calculated by the correction value control unit 466. For example, the $W_1$/rank determining unit 456 corrects the rank $r_1$ using the following Formula (44).

$$r'=r_1+\lfloor \delta+0.5 \rfloor \tag{44}$$

r' obtained by the above Formula is a value of any one of 1 to R (R is a maximum value of a rank) and so becomes like the following Formula (45).

$$r' = \begin{cases} 1 & r' < 1 \\ r' & 1 \le r' \le r \\ R & r' > R \end{cases} \tag{45}$$

The $W_1$/rank determining unit 456 determines a plurality of rank candidates based on r' obtained above using the following Formulae (46) and (47) similarly to the third embodiment.

$$r'_1=r' \tag{46}$$

$$r'_2=r'_1-1 \tag{47}$$

Here, when r' is 1, ($r_1'$, $r_2'$) are set to (1, 2). The $W_1$/rank determining unit 456 determines a first PMI by Formulae (31) and (32) using the $r_1'$ and $r_2'$ obtained above similarly to the third embodiment. Here, $r_1$ and $r_2$ in Formulae (31) and (32) are replaced with $r_1'$ and $r_2'$, respectively.

Thereafter, the second metric calculating units 460-1 to 460-M calculate a second metric using the first precoding matrix and a plurality of corrected candidate ranks calculated by the $W_1$/rank determining unit 456. For example, the second metric calculating units 460-1 to 460-M calculate a metric of each sub carrier similarly to the third embodiment. Here, $r_1$ and $r_2$ used when the same processing as in the third embodiment is performed are replaced with $r_1'$ and $r_2'$, respectively.

The maximum total metric calculating unit 462 adds channel capacities of all layers: 1 as represented by Formula (36). Then, the maximum total metric calculating unit 462 calculates a channel capacity $C^{rank}_{bw}(r)$ by adding channel capacity values of respective sub carriers which are largest among $i_2$ channel capacities in all sub carriers as represented by Formula (37).

The optimal CQI/PMI/RI determining unit 464 calculates a rank from among a plurality of candidate ranks using the second metric calculated by the second metric calculating units 460-1 to 460-M. Then, the optimal CQI/PMI/RI determining unit 464 calculates a first precoding matrix and a second precoding matrix using the calculated rank. For example, the optimal CQI/PMI/RI determining unit 464 determines a CQI, a PMI, and an RI similarly to the third embodiment. Here, $r_1$ and $r_2$ used when the same processing as in the third embodiment is performed are replaced with $r_1'$ and $r_2'$, respectively.

The correction value control unit 466 calculates a correction value used to correct the plurality of candidate ranks using the plurality of candidate ranks and the rank obtained from the candidate ranks. The correction value control unit 466 updates the correction value after CQI/PMI/RI determi nation. For example, the correction value control unit 466 calculates the following Formula (48).

$$\varepsilon = \begin{cases} -\beta_1 & \hat{r} - r' = -1 \\ \beta_2 & \hat{r} - r' = 0 \\ \beta_2 & \hat{r} - r' = 1 \end{cases} \quad (48)$$

In other words, the correction value control unit 466 calculates a difference between ˆr determined by the optimal CQI/PMI/RI determining unit 464 and r' calculated by Formula (45). In Formulae (46) and (47), ˆr is r' or r'−1, and so the difference is any one of 3 values of −1, 0, and 1. When the difference is −1, it means ˆr=r'−1=r2', and so control is performed such that a correction value becomes a negative value. Here, a previously set setting value such as $\beta_1$ is used. When the difference is 0, it means ˆr=r', and so a correction value of a positive value is given ($\beta_2$). When the difference is 1, since it means ˆr=1+r', processing when r' is 1 is performed, and correction of a positive value is performed. The correction value control unit 466 updates δ by the following Formula (49) using ϵ. Here, since a maximum value of a rank is R, when δ is −R or less or R or more as in Formula (50), δ is adjusted.

$$\delta = \delta + \epsilon \quad (49)$$

$$\delta = \begin{cases} -R + 1 & \delta \leq -R \\ \delta & -R < \delta < R \\ R - 1 & \delta \geq R \end{cases} \quad (50)$$

The second to fourth embodiments have been described in connection with the example in which the channel capacity of Formula (19) is used as the first metric, and $W_1$ and a rank are determined based on this metric, but the present invention is not limited to this example.

For example, as a modified embodiment of the second embodiment, the first metric calculating unit 254 may calculate a first metric by the following Formula (51).

$$d(r,i_1) = tr\{W_1(r,i_1)^H \Gamma W_1(r,i_1)\} \quad (51)$$

In this case, the $W_1$/rank determining unit 256 calculates a first precoding matrix of each rank using the first metric calculated by Formula (51) by the first metric calculating unit 254. The $W_1$/rank determining unit 256 calculates a third metric using the calculated first precoding matrix of each rank, and calculates a rank using the third metric. For example, the $W_1$/rank determining unit 256 may determine a PMI of optimal $W_1$ of each rank r by the following Formula (52) using a result of Formula (51).

$$\hat{i}_1(r) = \arg\max_{i_1} d(r, i_1) \quad (52)$$

Next, the $W_1$/rank determining unit 256 calculates the following Formula (53) as the third metric.

$$d(r, \hat{i}_1(r)) = \max_{i_2} \sum_{l=1}^{r} \log_2 \frac{1}{\sigma^2 \left(\sigma^2 I_{r \times r} + W_2(r, i_2)^H W_1(r, \hat{i}_1(r))^H \Gamma W_1(r, \hat{i}_1(r)) W_2(r, i_2)\right)_{l,l}^{-1}} \quad (53)$$

Formula (53) is similar to Formula (19), but since a first PMI of each rank r is estimated by Formulae (51) and (52), the $W_1$/rank determining unit 256 needs not perform a calculation on all of $i_1$ and perform a calculation only on $\hat{i}_1(r)$. Then, the $W_1$/rank determining unit 256 determines a rank by the following Formula (54). Here, in the third and fourth embodiments, ˆr in Formula (54) is replaced with $r_1$.

$$\hat{r} = \arg\max_{r} d(r, \hat{i}_1(r)) \quad (54)$$

Meanwhile, the first metric calculating unit 254 may calculate a first metric by the following Formula (55) rather than Formula (51).

$$d(r,i_1) = tr\{W_1(r,i_1)^H \Gamma W_1(r,i_1) E[W_2(r,i_2) W_2(r,i_2)^H]_{i_2}\} \quad (55)$$

A process after the first metric is calculated is the same as the process of Formulae (52) to (54). In other words, the $W_1$/rank determining unit 256 calculates a first precoding matrix of each rank using the first metric by Formula (55) by the first metric calculating unit 254. The $W_1$/rank determining unit 256 calculates a third metric using the calculated first precoding matrix of each rank, and calculates a rank using the calculated third metric. For example, the $W_1$/rank determining unit 256 may calculate a PMI of optimal $W_1$ of each rank r by the following Formula (52) using a result of Formula (55). The $W_1$/rank determining unit 256 calculates the following Formula (53) as the third metric. Then, the $W_1$/rank determining unit 256 determines a rank by the following Formula (54). Here, in the third and fourth embodiments, ˆr in Formula (54) is replaced with $r_1$.

Figure 12:
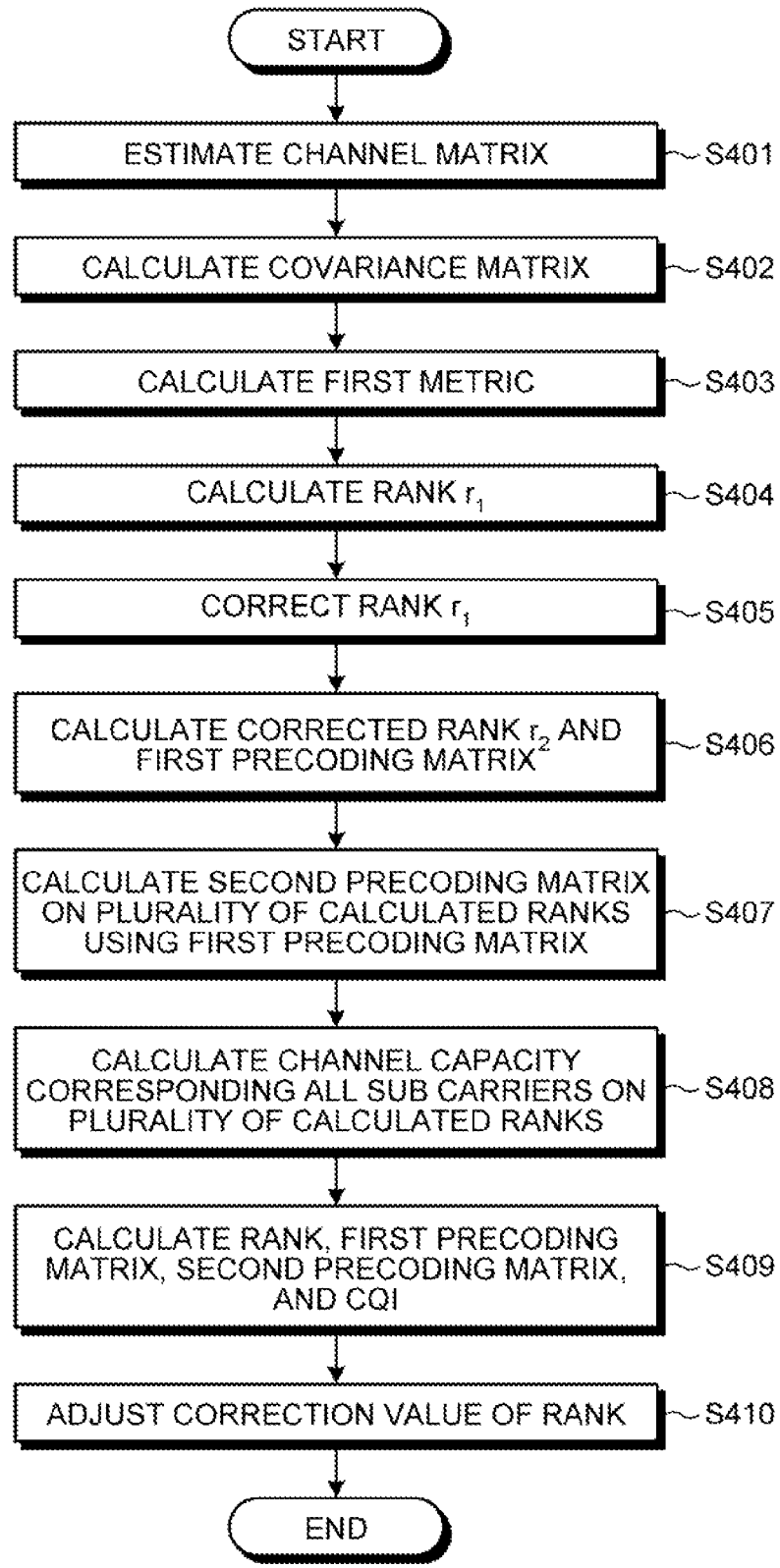
FIG. 12 is a flowchart of a process of a wireless device including the CQI/PMI/RI estimating unit of the fourth embodiment.

Next, the flow of a process of the wireless device 100, particularly, the flow of a process of the CQI/PMI/RI estimating unit 150 of the fourth embodiment will be described. FIG. 12 is a flowchart of a process of a wireless device including the CQI/PMI/RI estimating unit of the fourth embodiment.

As illustrated in FIG. 12, first, the channel/noise estimating unit 140 estimates a channel matrix based on the radio signal transmitted from the wireless device 200, for example, using Formula (2) (step S401). Then, the channel covariance matrix calculating unit 452 calculates a covariance matrix based on the channel matrix estimated by the channel/noise estimating unit 140, for example, using Formula (3) (step S402).

Then, the first metric calculating unit 454 calculates a first metric based on the covariance matrix calculated by the channel covariance matrix calculating unit 452, for example, using Formula (28) (step S403). Subsequently, the $W_1$/rank determining unit 456 calculates a rank $r_1$ based on the first metric calculated by the first metric calculating unit 454, for example, using Formula (29) (step S404).

Subsequently, the $W_1$/rank determining unit 456 corrects the rank $r_1$ (step S405). Then, the $W_1$/rank determining unit 456 calculates a corrected rank $r_2$ and a first precoding matrix common to a plurality of bands based on the corrected rank $r_1$ (step S406). The $W_1$/rank determining unit 456 corrects the rank $r_1$, for example, using Formula (44) and calculates the rank $r_2'$ using Formula (47). The $W_1$/rank determining unit 456 calculates the first precoding matrix, for example, using Formulae (31) and (32).

Subsequently, the second metric calculating units 460-1 to 460-M calculate a second metric using the first precoding matrix and the plurality of ranks calculated by the $W_1$/rank determining unit 456 (step S407). The second metric calculating units 460-1 to 460-M calculate the second metric on the plurality of calculated ranks, for example, using Formula (33).

Subsequently, the maximum total metric calculating unit 462 calculates a channel capacity by adding largest channel capacity values of respective sub carriers in all sub carriers based on the second metric calculated by the second metric calculating units 460-1 to 460-M (step S408). The maximum total metric calculating unit 462 adds channel capacities of all layers, for example, using Formula (36). The maximum total metric calculating unit 462 calculates a channel capacity $C^{rank}_{bw}(r)$ by adding channel capacity values of respective sub carriers which are largest among $i_2$ channel capacities in all sub carriers using Formula (37). The second metric calculating units 460-1 to 460-M and the maximum total metric calculating unit 462 execute the same processing in units of the plurality of calculated ranks.

Subsequently, the optimal CQI/PMI/RI determining unit 464 calculates a rank, a first precoding matrix, a second precoding matrix, and a CQI (step S409). For example, the optimal CQI/PMI/RI determining unit 464 calculates a rank, a first precoding matrix, a second precoding matrix, and a CQI based on the channel capacity corresponding to all sub carriers calculated by the maximum total metric calculating unit 462 in the plurality of calculated ranks. For example, the optimal CQI/PMI/RI determining unit 464 calculates the rank using Formula (38). Further, the optimal CQI/PMI/RI determining unit 464 calculates the first precoding matrix, for example, using Formula (40). Further, the optimal CQI/PMI/RI determining unit 464 calculates the second precoding matrix of each sub carrier, for example, using Formula (41). Further, the optimal CQI/PMI/RI determining unit 464 decides a CQI of each layer using the channel capacity calculated, for example, using Formula (43) and the CQI table 366.

Subsequently, the correction value control unit 466 adjusts a correction value of a rank based on a difference between a rank determined by the optimal CQI/PMI/RI determining unit 464 and a corrected rank (step S410). The correction value control unit 466 adjusts a correction value of a rank, for example, using Formulae (48) to (50).

Figure 13:
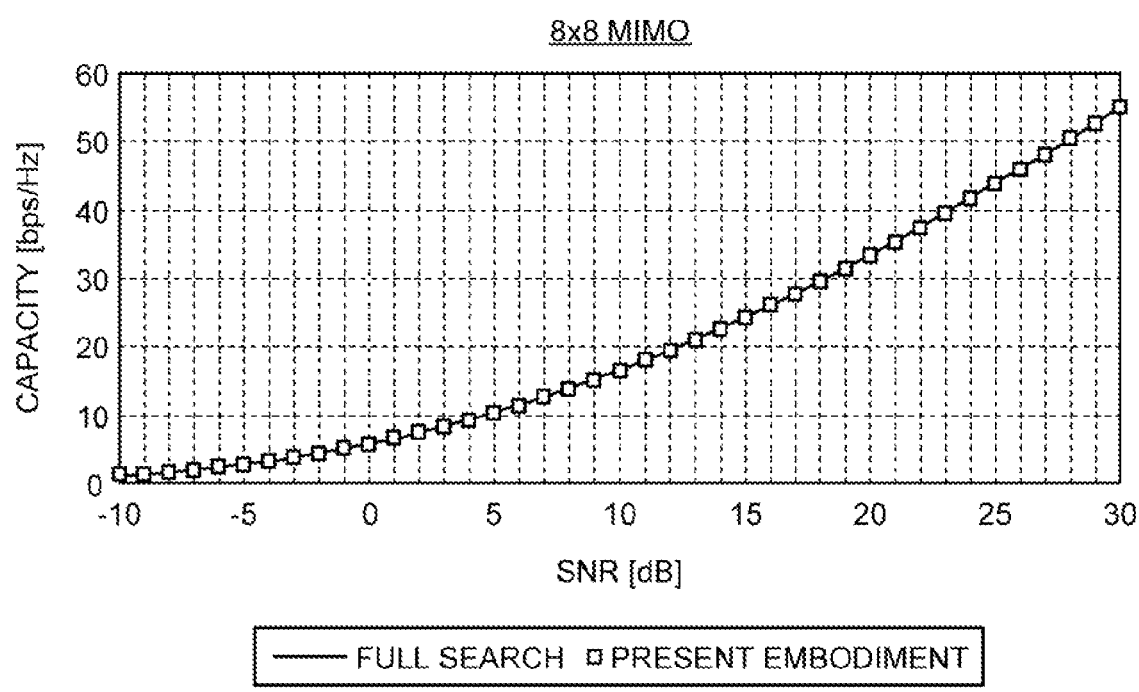
FIG. 13 is a diagram to describe an effect by the wireless device of the present embodiment.

FIG. 13 is a diagram to describe an effect by the wireless device of the present embodiment. FIG. 13 illustrates a result by a computer simulation when an 8×8 MIMO propagation environment is used as an ETU (Extended Typical Urban).

In FIG. 13, a vertical axis represents channel capacity (capacity), and a horizontal axis represents an SNR (Signal Noise Ratio). In FIG. 13, a solid line represents a relation between an SNR and a channel capacity when optimal PMI and RI are selected by a technique of calculating a metric on all PMIs and ranks for each sub carrier, and a plot by dots represents a relation between an SNR and a channel capacity when optimal PMI and RI are selected by the wireless device of the present embodiment.

As illustrated in FIG. 13, according to the wireless device of the present embodiment, it is possible to obtain the same channel capacity performance as a technique that calculates a metric on all PMIs and ranks for each sub carrier. Meanwhile, the wireless device of the present embodiment narrows down the rank and the first precoding matrix and so can reduce the computation cost compared to the conventional technique that calculates the metric on all PMIs and ranks for each sub carrier.

The above embodiments have been described focusing on the wireless device 100, but the present invention is not limited to this example. By executing a communication control program prepared in advance through a computer, the same functions as in the above embodiments can be implemented. In other words, the communication control program causes the wireless device to execute the process of estimating the channel matrix based on the radio signal transmitted from the transmitting station. Further, the communication control program causes the wireless device to execute the process of calculating the covariance matrix based on the estimated channel matrix. Further, the communication control program causes the wireless device to execute the process of calculating the first metric based on the calculated covariance matrix. Further, the communication control program causes the wireless device to execute the process of calculating the first precoding matrix common to a plurality of bands based on the calculated first metric. Further, the communication control program causes the wireless device to execute the process of calculating the second metric using the calculated first precoding matrix. Further, the communication control program causes the wireless device to execute the process of calculating the second precoding matrix of each band based on the calculated second metric. Further, the communication control program may be distributed to a computer via a communication network such as the Internet. The communication control program may be recorded in memory or a hard disk disposed in the wireless device or a computer readable recording medium. The communication control program may be read from the recording medium and then executed by the computer.

According to an embodiment of a wireless device disclosed in this disclosure, it is possible to reduce the computation cost in PMI estimation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A wireless device, comprising:
a channel matrix estimating unit that estimates a channel matrix based on a radio signal from a transmitting station;
a covariance matrix calculating unit that calculates a covariance matrix based on the channel matrix estimated by the channel matrix estimating unit;
a first metric calculating unit that calculates a first metric based on the covariance matrix calculated by the covariance matrix calculating unit;
a first determining unit that calculates a first precoding matrix common to a plurality of bands based on the first metric calculated by the first metric calculating unit;
a second metric calculating unit that calculates a second metric using the first precoding matrix calculated by the first determining unit; and
a second determining unit that calculates a second precoding matrix of each band based on the second metric calculated by the second metric calculating unit, wherein
a precoding matrix used by the wireless device is implemented by a combination of two types of the first precoding matrix and the second precoding matrix,
a number of PMI (Precoding Matrix Indicators) is more than in LTE (Lonq Term Evolution), and
the number of PMIs and a number of ranks to be searched increase more than in the LTE.

2. The wireless device according to claim 1,
wherein the second determining unit calculates either or both of a rank representing the number of transmission streams of a radio signal and a CQI (channel quality indicator) representing a modulation scheme and a coding rate in addition to the second precoding matrix.

3. The wireless device according to claim 1,
wherein the first metric calculating unit calculates the first metric by the following Formula:

$$d(r,i_1)=tr\{W_1(r,i_1)^H \Gamma W_1(r,i_1)\},$$

where $d(r, i_1)$ represents the first metric, $tr\{X\}$ represents a trace of a matrix X, $W_1(r, i_1)$ represents the first precoding matrix, H represents a complex conjugate transpose, and $\Gamma$ represents the channel covariance matrix.

4. The wireless device according to claim 1,
wherein the first metric calculating unit calculates the first metric by the following Formula:

$$d(r,i_1)=tr\{W_1(r,i_1)^H \Gamma W_1(r,i_1)E[W_2(r,i_2)W_2(r,i_2)^H]_{i_2}\},$$

where $d(r, i_1)$ represents the first metric, $tr\{X\}$ represents a trace of a matrix X, $W_1(r, i_1)$ represents the first precoding matrix, H represents a complex conjugate transpose, F represents the channel covariance matrix, and $E[W_2(r, i_2)W_2(r, i_2)^H]_{i_2}$ represents a mean value matrix of the second precoding matrix.

5. The wireless device according to claim 1,
wherein the first determining unit calculates a rank representing the number of transmission streams of a radio signal in addition to the first precoding matrix,
the second metric calculating unit calculates the second metric using the first precoding matrix and the rank calculated by the first determining unit, and
the second determining unit calculates the second precoding matrix using the second metric calculated by the second metric calculating unit.

6. The wireless device according to claim 5,
wherein the first determining unit calculates a plurality of candidate ranks representing the number of transmission streams of a radio signal in addition to the first precoding matrix,
the second metric calculating unit calculates the second metric using the first precoding matrix and the plurality of candidate ranks calculated by the first determining unit, and
the second determining unit calculates a rank from among the plurality of candidate ranks using the second metric calculated by the second metric calculating unit, and calculates the first precoding matrix and the second precoding matrix using the calculated rank.

7. The wireless device according to claim 6, further comprising:
a correction value control unit that calculates a correction value used to correct the plurality of candidate ranks using the plurality of candidate ranks and the rank obtained from among the plurality of candidate ranks,
the first determining unit corrects the plurality of candidate ranks using the correction value calculated by the correction value control unit,
the second metric calculating unit calculates the second metric using the first precoding matrix and the plurality of corrected candidate ranks calculated by the first determining unit, and
the second determining unit calculates a rank from among the plurality of corrected candidate ranks using the second metric calculated by the second metric calculating unit, and calculates the first precoding matrix and the second precoding matrix using the calculated rank.

8. The wireless device according to claim 5,
wherein the first metric calculating unit calculates the first metric by the following Formula:

$$d(r,i_1)=tr\{W_1(r,i_1)^H \Gamma W_1(r,i_1)\},$$

where $d(r, i_1)$ represents the first metric, $tr\{X\}$ represents a trace of a matrix X, $W_1(r, i_1)$ represents the first precoding matrix, H represents a complex conjugate transpose, and $\Gamma$ represents the channel covariance matrix, and
the first determining unit calculates the first precoding matrix of each rank using the first metric calculated by the first metric calculating unit, calculates the third metric using the calculated first precoding matrix of each rank, and calculates the rank using the calculated third metric.

9. The wireless device according to claim 5,
wherein the first metric calculating unit calculates the first metric using the following Formula:

$$d(r,i_1)=tr\{W_1(r,i_1)^H \Gamma W_1(r,i_1)E[W_2(r,i_2)W_2(r,i_2)^H]_{i_2}\},$$

where $d(r, i_1)$ represents the first metric, $tr\{X\}$ represents a trace of a matrix X, $W_1(r, i_1)$ represents the first precoding matrix, H represents a complex conjugate transpose, F represents the channel covariance matrix, $E[W_2(r, i_2)W_2(r, i_2)^H]_{i_2}$ represents a mean value matrix of a second precoding matrix, and
the first determining unit calculates the first precoding matrix of each rank using the first metric calculated by the first metric calculating unit, calculates the third metric using the calculated first precoding matrix of each rank, and calculates the rank using the calculated third metric.

10. The wireless device according to claim 1,
wherein the first metric calculating unit, the second metric calculating unit, or the first determining unit calculates channel capacity as the first metric, the second metric, or a third metric.

11. The wireless device according to claim 5,
wherein the second determining unit calculates a CQI representing a modulation scheme and a coding rate in addition to the first precoding matrix and the second precoding matrix.

12. A wireless device, comprising:
a channel matrix estimating unit that estimates a channel matrix based on a radio signal from a transmitting station;
a covariance matrix calculating unit that calculates a covariance matrix based on the channel matrix estimated by the channel matrix estimating unit;
a first metric calculating unit that calculates a first metric based on the covariance matrix calculated by the covariance matrix calculating unit;
a first determining unit that calculates a first precoding matrix common to a plurality of bands based on the first metric calculated by the first metric calculating unit;
a second metric calculating unit that calculates a second metric using the first precoding matrix calculated by the first determining unit; and
a second determining unit that calculates a second precoding matrix of each band based on the second metric calculated by the second metric calculating unit, wherein the second metric calculating unit executes calculation of the second metric on each sub carrier k (k=1 to M), and executes the calculation on all considered ranks (r=1 to R).

13. A wireless device, comprising:
- a channel matrix estimating unit that estimates a channel matrix based on a radio signal from a transmitting station;
- a covariance matrix calculating unit that calculates a covariance matrix based on the channel matrix estimated by the channel matrix estimating unit;
- a first metric calculating unit that calculates a first metric based on the covariance matrix calculated by the covariance matrix calculating unit;
- a first determining unit that calculates a first precoding matrix common to a plurality of bands based on the first metric calculated by the first metric calculating unit;
- a second metric calculating unit that calculates a second metric using the first precoding matrix calculated by the first determining unit; and
- a second determining unit that calculates a second precoding matrix of each band based on the second metric calculated by the second metric calculating unit, wherein
- the second determining unit calculates either or both of a rank representing the number of transmission streams of a radio signal and a CQI (channel quality indicator) representing a modulation scheme and a coding rate in addition to the second precoding matrix and
- the second determining unit calculates the rank, the second precoding matrix, and the CQI based on a channel capacity corresponding to all sub carriers calculated in each rank.

* * * * *